(12) United States Patent
Albasheir et al.

(10) Patent No.: US 11,722,419 B1
(45) Date of Patent: Aug. 8, 2023

(54) BANDWIDTH-DEPENDENT SELECTION OF A PACKET ROUTING NODE

(71) Applicant: T-Mobile USA, Inc., Bellevue, WA (US)

(72) Inventors: Suliman Albasheir, Sammamish, WA (US); Muhammad Waqar Afzal, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 301 days.

(21) Appl. No.: 17/220,868

(22) Filed: Apr. 1, 2021

(51) Int. Cl.
*H04L 47/24* (2022.01)
*H04L 41/147* (2022.01)
*H04L 43/02* (2022.01)

(52) U.S. Cl.
CPC ............ *H04L 47/24* (2013.01); *H04L 41/147* (2013.01); *H04L 43/02* (2013.01)

(58) Field of Classification Search
CPC ........ H04L 47/24; H04L 41/147; H04L 43/02
See application file for complete search history.

(56) References Cited

U.S. PATENT DOCUMENTS

| | | | | |
|---|---|---|---|---|
| 7,860,999 B1 * | 12/2010 | Subramanian | .......... | H04L 45/38 370/230.1 |
| 8,849,984 B2 * | 9/2014 | Yamagishi | ............ | H04L 65/611 709/224 |
| 8,875,223 B1 * | 10/2014 | Chen | .................... | H04L 63/0272 726/1 |
| 11,051,201 B2 * | 6/2021 | Palnati | .................. | H04W 88/16 |
| 2008/0165685 A1 * | 7/2008 | Weiss | .................... | H04L 47/801 370/231 |
| 2014/0047114 A1 * | 2/2014 | Chokshi | ................ | H04L 67/141 709/225 |
| 2015/0074232 A1 * | 3/2015 | Phillips | ................. | H04L 67/303 709/219 |
| 2021/0014155 A1 * | 1/2021 | Punj | ....................... | H04L 45/245 |
| 2021/0337611 A1 * | 10/2021 | Dodd-Noble | ......... | H04W 8/065 |
| 2022/0264664 A1 * | 8/2022 | Patil | ...................... | H04W 4/029 |

* cited by examiner

*Primary Examiner* — Chi H Pham
*Assistant Examiner* — Weibin Huang
(74) *Attorney, Agent, or Firm* — Barta, Jones & Foley, PLLC (57) ABSTRACT

Bandwidth-dependent selection of a packet routing node (e.g., user plane function (UPF) for 5G, packet data network gateway user plane function (PGW-U) for 4G) includes determining, for each of a plurality of packet routing nodes, a bandwidth capacity to an access network (e.g., a radio access node); receiving a request for a data traffic session; determining whether the data traffic session comprises a bandwidth priority; identifying a subset of the plurality of packet routing nodes having a higher bandwidth capacity than others of the plurality (e.g., the packet routing node having the highest capacity, or the top percentage); based on at least determining that the data traffic session comprises a bandwidth priority data traffic session, selecting a packet routing node for the data traffic session from the subset; and establishing the data traffic session through the selected packet routing node.

20 Claims, 7 Drawing Sheets

BANDWIDTH-DEPENDENT SELECTION OF A PACKET ROUTING NODE

BACKGROUND

In fifth generation (5G) and fourth generation (4G) cellular networks, which use control and user plane separation (CUPS), a session management node (a session management function (SMF) in 5G or a packet data network gateway (PGW) control plane function (PGW-C) for 4G) selects a packet routing node (a user plane function (UPF) for 5G or a PGW user plane function (PGW-U) for 4G). Currently, the selection of the packet routing node may be based on a rotational basis (e.g., a round-robin approach) or loading. Unfortunately, because traffic routing between packet routing nodes and access networks may be complex, with varying bandwidth performance for different packet routing nodes, these approaches may result in sub-optimal selection when a session with an expected high bandwidth demand is assigned to a packet routing node with poor bandwidth performance.

SUMMARY

The following summary is provided to illustrate examples disclosed herein, but is not meant to limit all examples to any particular configuration or sequence of operations.

A solution for bandwidth-dependent selection of a packet routing node (e.g., a user plane function (UPF) for fifth generation (5G) cellular networks or a packet data network gateway (PGW) user plane function (PGW-U) for fourth generation (4G) cellular networks) includes repeatedly determining, for each of a plurality of packet routing nodes, a bandwidth capacity between a packet routing node of the plurality of packet routing nodes and an access network; receiving, by a session management node, from a user equipment (UE), a request for a data traffic session; determining whether the data traffic session comprises a bandwidth priority data traffic session; identifying a subset of the plurality of packet routing nodes having a higher bandwidth capacity than other ones of the plurality of packet routing nodes (e.g., the packet routing nodes having the highest bandwidth capacity, or the top predetermined percentage); based on at least determining that the data traffic session comprises a bandwidth priority data traffic session, selecting a first packet routing node for the data traffic session from the subset of the plurality of packet routing nodes having the higher bandwidth capacity; and establishing the data traffic session for the UE through the first packet routing node.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A solution for bandwidth-dependent selection of a packet routing node (e.g., a user plane function (UPF) for fifth generation (5G) cellular networks or a packet data network gateway (PGW) user plane function (PGW-U) for fourth generation (4G) cellular networks) includes repeatedly determining, for each of a plurality of packet routing nodes, a bandwidth capacity between a packet routing node of the plurality of packet routing nodes and an access network; receiving, by a session management node, from a user equipment (UE), a request for a data traffic session; determining whether the data traffic session comprises a bandwidth priority data traffic session; identifying a subset of the plurality of packet routing nodes having a higher bandwidth capacity than other ones of the plurality of packet routing nodes (e.g., the packet routing nodes having the highest bandwidth capacity, or the top predetermined percentage); based on at least determining that the data traffic session comprises a bandwidth priority data traffic session, selecting a first packet routing node for the data traffic session from the subset of the plurality of packet routing nodes having the higher bandwidth capacity; and establishing the data traffic session for the UE through the first packet routing node.

Aspects of the disclosure improve the speed of cellular data sessions by determining whether a data traffic session comprises a bandwidth priority data traffic session and, if so, selecting a packet routing node for the data traffic session from a subset of a plurality of packet routing nodes having a higher bandwidth capacity. This process assigns data traffic sessions having needs or priority for high bandwidth to packet nodes having the highest (or among the highest) bandwidth capacity.

Aspects of the disclosure select higher (or highest) bandwidth user plane functions in cellular networks (e.g., 5G and 4G cellular networks). In some examples, this is used for premium services for premium subscribers who need to consume high bandwidth. The user plane may use bandwidth measurement packets to identify fastest nodes (e.g., run bandwidth tests toward each of multiple access networks), and a policy function establishes whether a requested data session may be associated with bandwidth prioritization. In some examples, a session management node builds a table for each packet routing node with each access network, which is updated as needed (e.g., on a schedule, or on-demand). When a UE requests a session, the session management node checks with a policy node to determine whether the UE needs high bandwidth and, if so, assigns a higher-bandwidth capacity packet routing node to serve the UE.

Figure 1A:
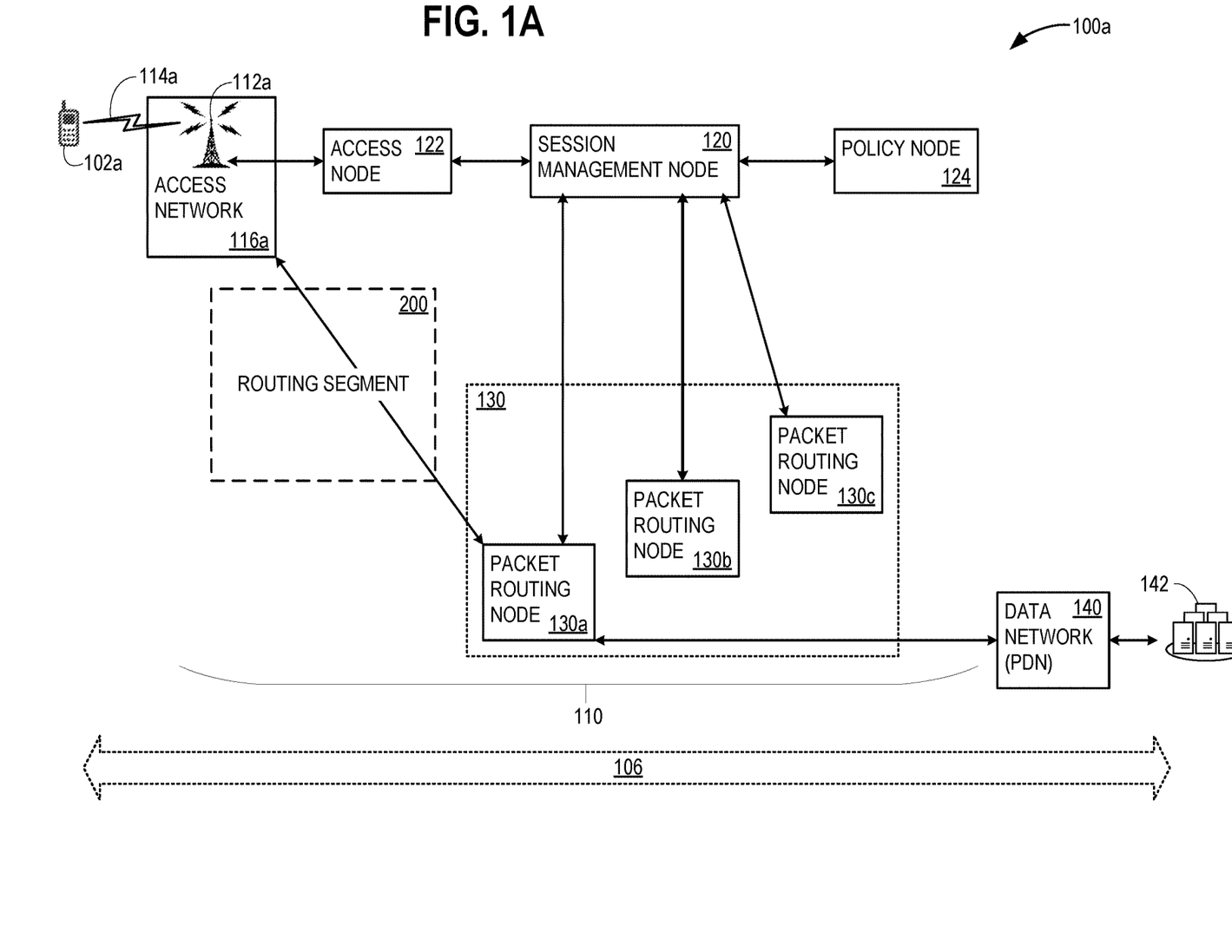
FIG. 1A illustrates an exemplary arrangement that may advantageously establish a data traffic session for a user equipment (UE) on a network using bandwidth-dependent selection of a packet routing node.
Figure 1B:
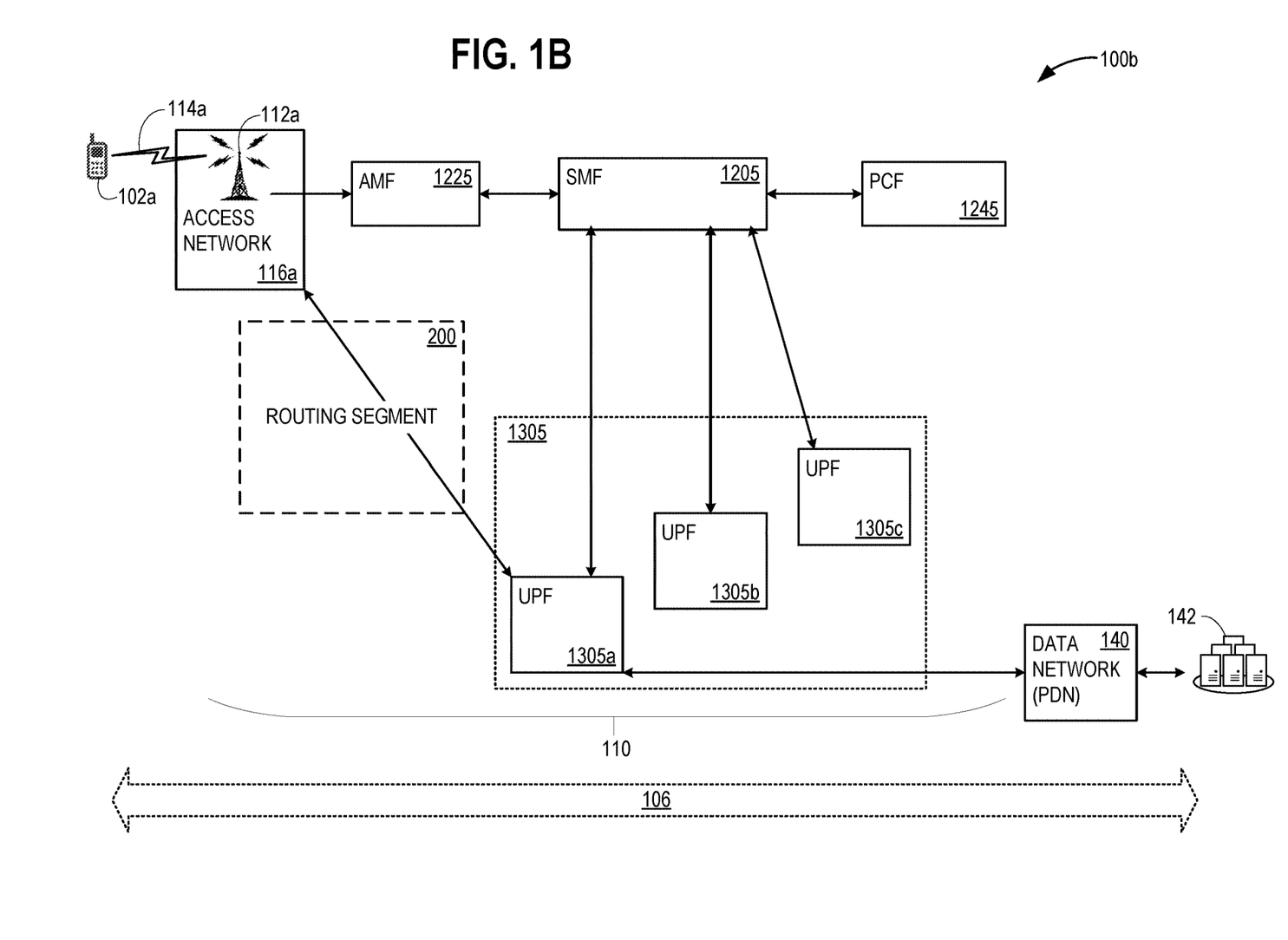
FIG. 1B illustrates a fifth generation (5G) version of FIG. 1A.
Figure 1C:
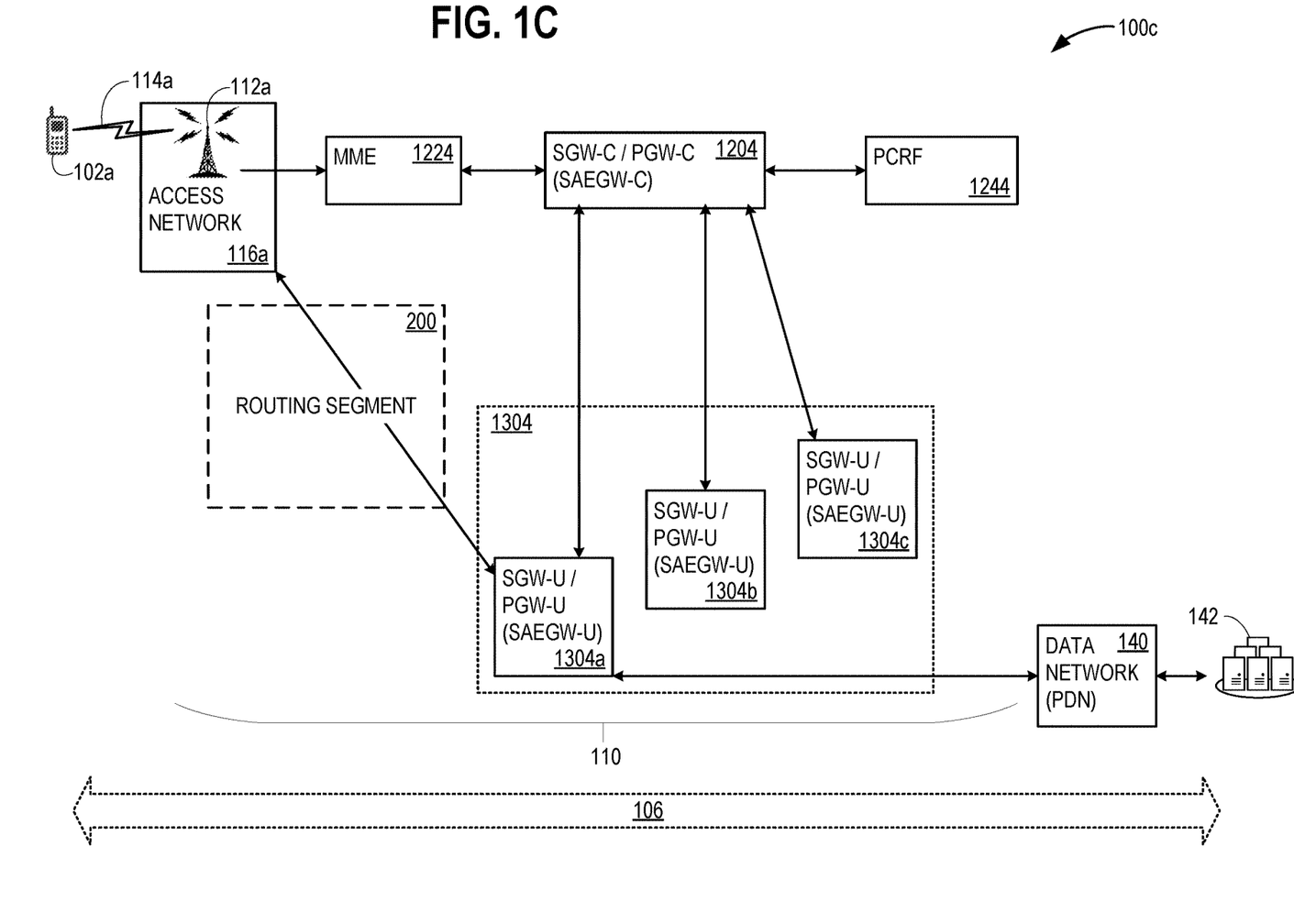
FIG. 1C illustrates a fourth generation (4G) version of FIG. 1A.

With reference now to the figures, FIG. 1A illustrates an exemplary arrangement 100a that may advantageously establish a data traffic session 106 for a UE 102 on a network 110, using bandwidth-dependent selection of packet routing nodes 130a, 130b, and 130c (together, a plurality of packet routing nodes 130). Network 110 may be a 5G cellular network, a 4G cellular network, a blend of 5G and 4G, or another type of network. FIG. 1B illustrates an exemplary arrangement 100b in which components of arrangement 100a are represented as 5G cellular network components, and FIG. 1C illustrates an exemplary arrangement 100c in which components of arrangement 100a are represented as a 4G cellular network components.

Referring first to FIG. 1A, arrangement 100a comprises a UE 102a that is attempting to establish a data traffic session 106 with a data network (DN) 140, in order to reach a network resource 142 (e.g., a streaming video service). In some examples, DN 140 comprises a packet data network (PDN). UE 102a communicates with a base station of a radio access network (RAN) 112a over an air interface 114a. A RAN is a part of a telecommunications network that connects individual devices to other parts of a network through radio connections. RAN 112a is a component of an access network 116a. When established, data traffic session 106 will pass from UE 102a, across air interface 114a, through access network 116a (specifically, through RAN 112a), through a routing segment 200, through a selected one of a plurality of packet routing nodes 130, and to DN 140. Routing segment 200 is described in further detail in relation to FIG. 2.

However, to set up data traffic session 106, UE 102a sends a request (e.g., a session initiation protocol (SIP) message) through access network 116a, and through an access node 122, to a session management node 120. Session management node 120 selects one of plurality of packet routing nodes 130 (e.g., packet routing node 130a, packet routing node 130b, or packet routing node 130c). Session management node 120 communicates with a policy node 124 to determine policies, including subscriber-specific policies, relevant to UE 102a.

FIG. 1B illustrates a 5G version of FIG. 1A. Access node 122 is shown as an access and mobility management function (AMF) 1225. An AMF receives connection and session related information from a UE, and is responsible for handling connection and mobility management tasks. Session management node 120 is shown as a session management function (SMF) 1205. An SMF is responsible for interacting with a decoupled data plane, creating, updating, and removing protocol data unit (PDU) sessions and managing session context with a user plane function (UPF). Plurality of packet routing nodes 130 is shown as a plurality of UPFs 1305, specifically a UPF 1305a, a UPF 1305b, and a UPF 1305c. A UPF is responsible for packet routing and forwarding, packet inspection, quality of service (QoS) handling, and external PDU sessions for interconnecting with DNs. Policy node 124 is shown as a policy control function (PCF) 1245. A PCF provides policy rules for control plane functions and hosts accesses subscription information for policy decisions.

FIG. 1C illustrates a 4G version of FIG. 1A. Access node 122 is shown as a mobility management entity (MME) 1224. An MME is responsible for authenticating UEs and provides the control plane function for mobility. Session management node 120 is shown as a system architecture evolution gateway (SAEGW) control plane function (SAEGW-C) 1204, which includes a serving gateway (SGW) control plane function (SGW-C) and a packet data network gateway (PGW) control plane function (PGW-C). Plurality of packet routing nodes 130 is shown as a plurality of system architecture evolution gateways (SAEGW) user plane function (SAEGW-Us) 1304, specifically, an SAEGW-U 1304a, an SAEGW-U 1304b, and an SAEGW-U 1304c. Each SAEGW-U includes an SGW user plane function (SGW-U) and a PGW user plane function (PGW-U). An SGW routes and forwards user data packets, while also acting as a mobility anchor. A PGW provides connectivity between a UE and external DNs, acting as an entry and exit point of traffic for the UE. A UE may have simultaneous connectivity with more than one PGW for accessing multiple DNs. Policy node 124 is shown as a policy and charging rules function (PCRF) 1244. A PCRF provides policy rules for control plane functions and hosts accesses subscription information for policy decisions. A PCRF provides policy control decisions and flow based charging controls, for example, determining how service data flows are treated, to ensure that the user plane traffic mapping and treatment is in accordance with the user's profile.

Figure 2:
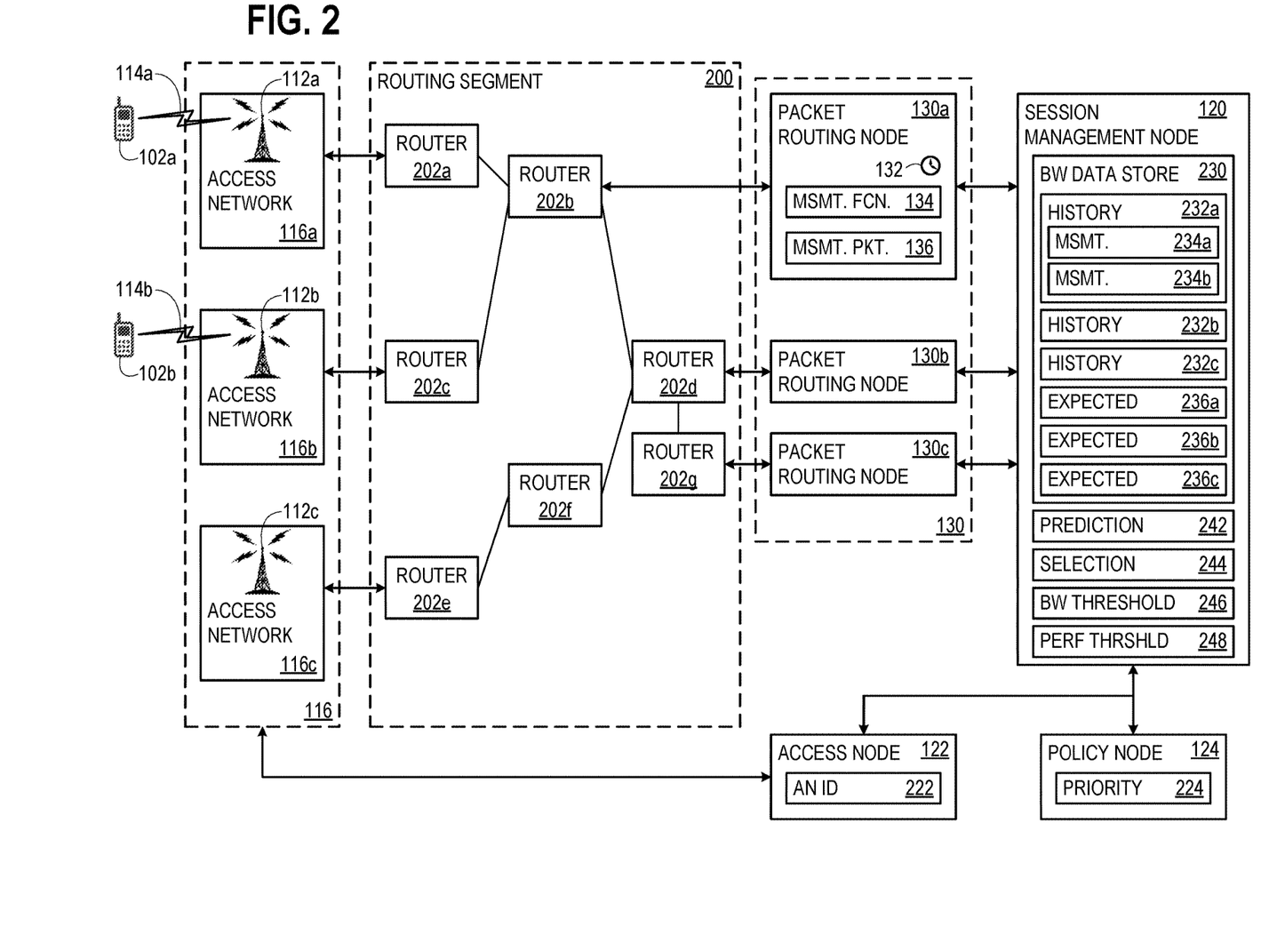
FIG. 2 illustrates further detail for components in the arrangement of FIG. 1.

FIG. 2 illustrates further detail for arrangement 100a. Routing segment 200 introduces variability in the bandwidth capacity between plurality of packet routing nodes 130 (packet routing nodes 130a, 130b, and 130c) and a plurality of access networks 116 which is illustrated as comprising access network 116a, an access network 116b, and an access network 116c. Although three packet routing nodes and three access networks are shown, it should be understood that this is for illustrative purposes only, and different numbers of packet routing nodes and access networks may be used. Similar to access network 116a, access networks 116b and 116c each comprise a RAN, specifically RAN 112b and RAN 112c, respectively. A second UE 102b communicates with a base station of RAN 112b over an air interface 114.

Routing segment 200 includes a plurality of routers, shown as routers 202a-202g. Access network 116a connects to router 202a, which connects to router 202b, which connects to packet routing node 130a. Access network 116b connects to router 202c, which connects to router 202b, which connects to router 202d, which connects to packet routing node 130b. Access network 116c connects to router 202e, which connects to router 202f, which connects to router 202d, which connects to router 202g, which connects to packet routing node 130c. Any of access networks 116a-116c may reach any of packet routing nodes 130a-130b by stepping through the proper sequence of routers. For example, access network 116a may reach packet routing node 130c through router 202a, router 202b, router 202d and router 202g. Access network 116c may reach packet routing node 130a through router 202e, router 202f, router 202d and router 202b. It should also be understood that the number and connectivity described for routing segment 200 is also only for illustrative purposes, and a different topology and number of routers may be used. It should also be understood that connectivity may change dynamically so that a particular route between an access network and a packet routing node may change at any time.

Plurality of access networks 116 connects to plurality of packet routing nodes 130 through a complex and time-varying set of pathways. Further, each of routers 202a-202g may be loaded differently, with differing packet queue delays. Thus, the bandwidth capacities between each combination of access networks 116a-116c and packet routing nodes 130a-130c may vary both from among each other and also varying with time (e.g., as pathways change and router loading changes).

In order to measure bandwidth capacity between itself and each of access networks 116a-116c, packet routing node 130a has a timer 132 and a measurement function 134. Packet routing node 130a repeatedly transmits measurement packets (e.g., a measurement packet 136) to each of access networks 116a-116c. In some examples, measurement packet 136 is sent as a loop-back packet, and the destination access network returns measurement packet 136 or another version suitable for measuring bandwidth capacity through routing segment 200. In some examples, packet routing node 130b and 130c are similarly configured. This provides the possibility of measuring bandwidth capacity between any combination of combination of access networks 116a-116c and packet routing nodes 130a-130c. In some examples, access networks 116a-116c perform the bandwidth capacity measurements instead of or in addition to packet routing nodes 130a-130c. In such examples, access networks 116a-116c will each have timers and/or measurement functions.

The bandwidth capacity measurements are performed repeatedly, based on a schedule (e.g., using a timer period) and/or a demand (e.g., requested by session management node 120, based on an Nth data traffic session request). The bandwidth capacity measurements are forwarded to session management node 120 to be stored in a bandwidth data store 230. Bandwidth data store 230 holds a measured bandwidth history covering a plurality of measured bandwidth values indexed by each of packet routing nodes 130a-130c and/or each of access networks 116a-116c. Session management node 120 uses measured bandwidth values stored in bandwidth data store 230 to select from among packet routing nodes 130a-130c to use for data traffic sessions for UEs 102a and 102b.

Figure 3:
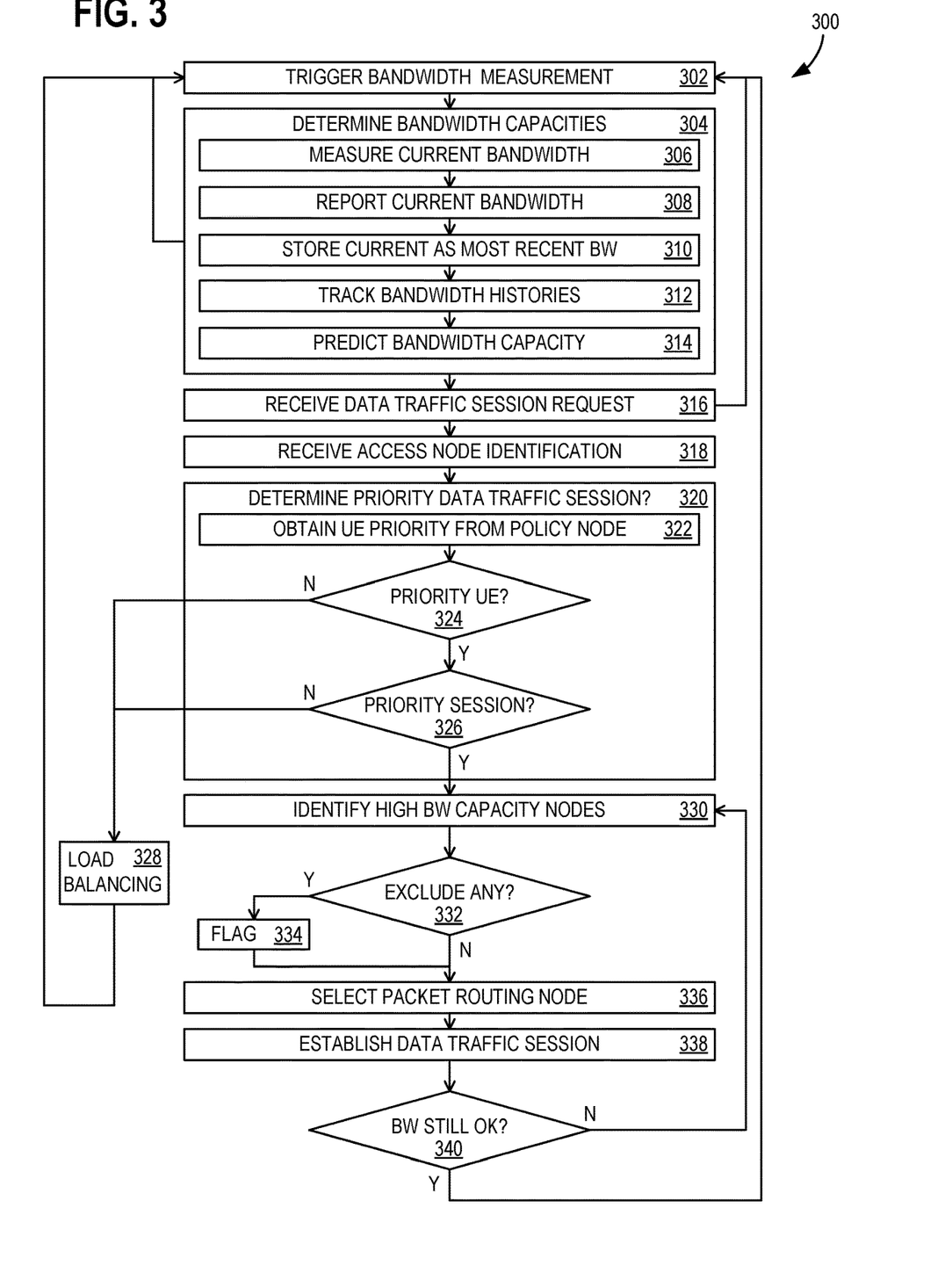
FIG. 3 illustrates a flow chart of exemplary operations associated with the arrangement of FIG. 1.

Further description of FIGS. 1A and 2 will be made with additional reference to FIG. 3. FIG. 3 illustrates a flowchart 300 of exemplary operations associated with bandwidth-dependent selection of a packet routing node. In some examples, at least a portion of flowchart 300 may be performed using one or more computing devices 500 of FIG. 5. FIGS. 1A, 2, and 3 should be viewed together. A trigger condition in operation 302 triggers measurements of bandwidth capacities between each combination of packet routing nodes 130a-130c and access networks 116a-116c in operation 304. In some examples, some of packet routing nodes 130a-130c may not be in communication with each of access networks 116a-116c. In some examples, the trigger condition comprises: completion of a timer period (e.g., using timer 132) and/or receiving a request for a data traffic session (for example, every Nth occurrence of operation 316, described below). Operations 302 and 304 repeat in an ongoing manner.

As illustrated, operation 304 comprises multiple operations 306-314. In general, operation 304 includes determining, for each of plurality of packet routing nodes 130, the bandwidth capacity between packet routing nodes 130a-160c (plurality of packet routing nodes 130) and access networks 116a-116c. FIG. 3 is described using a scenario in which session management node 120 selects packet routing node 130a for UE 102a, which is using access network 116a. In some examples, the determination of operation 304 is attributed to session management node 120, for example session management node 120 receives packet measurements from packet routing nodes 130a-160c and/or access networks 116a-116c and makes the determinations of the bandwidths. In some examples, packet routing nodes 130a-measure and determine bandwidth values and reports the determined bandwidth values to session management node 120.

In some examples, such as 5G examples, access networks 116a-116c comprise RANs. In some examples (such as 5G), each of packet routing nodes 130a-130c comprises a UPF and session management node 120 comprises an SMF. In some examples (such as 4G), each of packet routing nodes 130a-130c comprises a PGW-U and session management node 120 comprises a PGW-C. In some examples (such as 4G), each of packet routing nodes 130a-130c comprises an SGW-U and/or an SAEGW-U, and session management node 120 comprises an SGW-C and/or an SAEGW-C.

Operation 306 includes measuring bandwidth between packet routing nodes 130a-130c and access networks 116a-116c (including bandwidth between packet routing node 130a and access network 116a). In some examples, measuring bandwidth between packet routing nodes 130a-130c and access networks 116a-116c comprises transmitting a packet between each packet routing node and each access network. Operation 308 includes reporting, to session management node 120, the measured bandwidth. The measurement reports will include identification of the specific packet routing node and access network pair. In some examples, the reports are sent by packet routing nodes 130a-130c. In some examples, the reports are sent by access networks 116a-116c. In some examples, the reports are sent by both packet routing nodes 130a-130c and access networks 116a-116c. Session management node 120 is able to build a table of measurement values in bandwidth data store 230.

Session management node 120 stores the reported bandwidth capacity values at 310. Operation 310 includes storing, for each of plurality of packet routing nodes 130, the measured bandwidth. In some examples, operation 304 terminates here, and the bandwidth capacity between packet routing node 130a (of plurality of packet routing nodes 130) and access network 116a, which is used for selecting the packet routing network, comprises the (most recently) measured bandwidth capacity.

In some examples, the determination of bandwidth capacity involves additional operations 312 and 314. Operation 312 includes tracking a measured bandwidth history covering a plurality of measured bandwidth values. For example, bandwidth data store 230 is shown as having a bandwidth history 232a for packet routing node 130a. Bandwidth history 232a is shown as having a measurement 234a, which may be the most recent measurement of the bandwidth capacity toward access network 116a, and a measurement 234b that that may be an earlier measurement for the bandwidth capacity toward access network 116a. In some examples, bandwidth history 232a has additional earlier measurements toward access network 116a, and a similar time-series set of measurements for the bandwidth capacity toward each of access networks 116b and 116c. Similarly, bandwidth data store 230 also has a bandwidth history 232b for packet routing node 130b and a bandwidth history 232c for packet routing node 130c. For clarity in FIG. 2, the additional level of similar detail is not shown.

In some examples, operation 314 leverages bandwidth histories 232a-232c to predicting expected bandwidth capacities for packet routing nodes 130a-130c, and includes, based on at least the measured bandwidth history, predicting an expected bandwidth capacity 236a for packet routing node 130a, an expected bandwidth capacity 236b for packet routing node 130b, and an expected bandwidth capacity 236c for packet routing node 130c. In some examples, predicting the expected bandwidth capacity comprises performing a moving window operation on the measured bandwidth history. In some examples, predicting the expected bandwidth capacity comprises performing a weighted moving window operation on the measured bandwidth history (e.g., weighting more recent measurements more heavily, discounting sudden increases, heavily weighting sudden decreases or other schemes). A prediction component 242 performs the calculations. In some examples, predicting the expected bandwidth capacity comprises providing the measured bandwidth history to a machine learning (ML) model. In such examples, prediction component 242 comprises an ML component. (Artificial intelligence (AI) is included within the meaning of ML herein.)

In some examples in which operation 304 includes operations 312 and 314, the bandwidth capacity between packet routing node 130a (of plurality of packet routing nodes 130) and access network 116a, which is used for selecting the packet routing network, comprises the expected bandwidth capacity (e.g., one of expected bandwidth capacities 234a-234c).

The incoming request for data traffic session 106 arrives at session management node 120 from UE 102a at 316. Operation 316 includes receiving, by session management node 120, from UE 102a, a request to set up data traffic session 106. In some examples, the request to set up data traffic session 106 comprises a request to set up data traffic session between UE 102a and DN 140. In some examples, DN 140 comprises a PDN. In some examples, the request to set up data traffic session 106 is received through access node 122. In some examples, such as 5G, access node 122 comprises an AMF. In some examples, such as 4G, access node 122 comprises an MME. Access node 122 sends an access network identification (AN ID) 222 at 318, so that session management node 120 knows which measurements to compare for each of packet routing nodes 130a-130c (e.g., compare the bandwidth capacities between access network 116a and each of packet routing nodes 130a-130c). Thus, operation 318 includes receiving, by session management node 120, from access node 122, identification of access network 116a.

Operation 320 determines whether data traffic session 106 comprises a bandwidth priority data traffic session, and is implemented using operations 322-328, in some examples. In some examples, operation 320 is performed by session management node 120 using a selection component 244. Operation 322 includes receiving, by session management node 120, from policy node 124, an indication whether UE 102a is associated with bandwidth prioritization. In some examples, such as 5G, policy node 124 comprises a PCF. In some examples, such as 4G, policy node 124 comprises a PCRF.

In some examples, policy node 124 maintains a priority list 224 of premium subscribers, which includes UE 102a. If a UE is on priority list 224, operation 322 includes receiving, by session management node 120, from a policy node, an indication that the UE is associated with bandwidth prioritization. In decision operation 324, session management node 120 determines, based on the response received from policy node 124 (e.g., that a particular UE is or is not on priority list 224), whether UE associated with bandwidth prioritization (e.g., UE 102a is a priority UE). If not, flowchart 300 moves to operation 328 for normal load balancing, and then returns to waiting for the next measurement trigger at 302. In some examples, decision operation 324 provides the determination for operation 320. In some examples, an additional determination is made: whether requested data traffic session 106 is of the type that needs high bandwidth.

Decision operation 326 determines whether the data traffic session requested by a UE is associated with bandwidth prioritization (e.g., is a priority session). For example, a voice call requires low latency, but not high bandwidth. In some examples, streaming video does require high bandwidth and so is associated with bandwidth prioritization. In some examples, decision operation 326 determines whether the requested data traffic session comprises a session type associated with a bandwidth demand above a bandwidth priority threshold 246. In some examples, bandwidth priority threshold 246 will be set above the data rate for voice, but below the data rate for streaming high resolution video imagery. If the requirements for a priority session are not met, flowchart 300 moves to operation 328 for normal load balancing, and then returns to waiting for the next measurement trigger at 302.

Otherwise, the criteria are met for data traffic session 106 to be a priority data traffic session. Operation 330 includes identifying a subset of plurality of packet routing nodes 130 having a higher bandwidth capacity than other ones of plurality of packet routing nodes 130 (e.g., the top N bandwidths). For example, packet routing node 130a may have the highest bandwidth capacity to access network 116a, packet routing node 130b may have the second highest bandwidth capacity to access network 116a, and packet routing node 130v may have the lowest bandwidth capacity to access network 116a. In some examples, the subset is just a single entry: the packet routing node having the highest bandwidth capacity out of plurality of packet routing nodes 130. In some examples, the subset includes all of plurality of packet routing nodes 130 having a bandwidth capacity above a minimum performance threshold 248. In some examples, the subset includes packet routing nodes having a bandwidth capacity within a top predetermined percentage of plurality of packet routing nodes 130. Other criteria may also be used.

Decision operation 332 determines whether there is a reason to exclude any of the packet routing nodes within the subset, for example, excluding the packet routing node having the highest bandwidth from consideration for use in data traffic session 106. Some reasons for decision operation 332 may be to avoid assigning too many priority data traffic sessions to a single packet routing node, and instead spread priority data traffic sessions in a more balanced way among the packet routing nodes that have sufficient bandwidth to support the demands. If there is a reason, operation 334 flags the particular packet routing node in operation 334.

Selection component 244 selects the packet routing node in operation 336 which includes, based on at least determining that data traffic session 106 comprises a bandwidth priority data traffic session, selecting packet routing node 130a for data traffic session 103 from the subset of plurality of packet routing nodes 130 having the higher bandwidth capacity. Data traffic session 106 is established at 338. Operation 338 includes establishing data traffic session 106 for UE 102a through first packet routing node 130a.

In some scenarios, the packet routing node initially selected may suffer performance degradation while a data traffic session is ongoing. Some examples therefore monitor bandwidth capacity, and decision operation 340 includes determining whether packet routing node 130a is unable to meet a bandwidth demand of data traffic session. If packet routing node 130a is still performing acceptably, flowchart 300 returns to waiting for the next measurement trigger at 302.

However, if decision operation 340 determines that packet routing node 130a is unable to meet a bandwidth demand of data traffic session 106, flowchart 300 returns to operation 330 to select a new packet routing node. For example, operations 330-336 include determining that second packet routing node (e.g., packet routing node 130c) of plurality of packet routing nodes 130 is able to meet the bandwidth demand of data traffic session 106. The selection of packet routing node 130c to replace packet routing node 130a for data traffic session 106 occurs during this second pass through operations 336-338, and includes, based on at least determining that packet routing node 130a is unable to meet the bandwidth demand of data traffic session 106 and determining that packet routing node 130c is able to meet the bandwidth demand of data traffic session 106, transferring data traffic session 106 from packet routing node 130a to packet routing node 130c.

As indicated, flowchart 300 repeats. When UE 102b requests to set up a data traffic session, flowchart 300 returns to operation 316. In this pass, operation 316 includes receiving, by session management node 120, from UE 102b, a request to set up a second data traffic session. Operation 320 includes (in this pass) determining whether the second data traffic session comprises a bandwidth priority data traffic session. Decision operation 332 is relevant here, if the process has been set up to attempt spreading priority data traffic sessions among acceptable packet routing nodes. For example, if data traffic session 106 is still using packet routing node 130a, then operation 334 flags packet routing node 130a so that selection component 244 will not select packet routing node 130a for use with UE 102b. Operations 332-336 include, based on at least determining that the second data traffic session comprises a bandwidth priority data traffic session, selecting a different packet routing node (e.g., packet routing node 130b) for the second data traffic session than for data traffic session 106. Operation 338 then includes establishing the second data traffic session for UE 102b through the selected different packet routing node.

Figure 4:
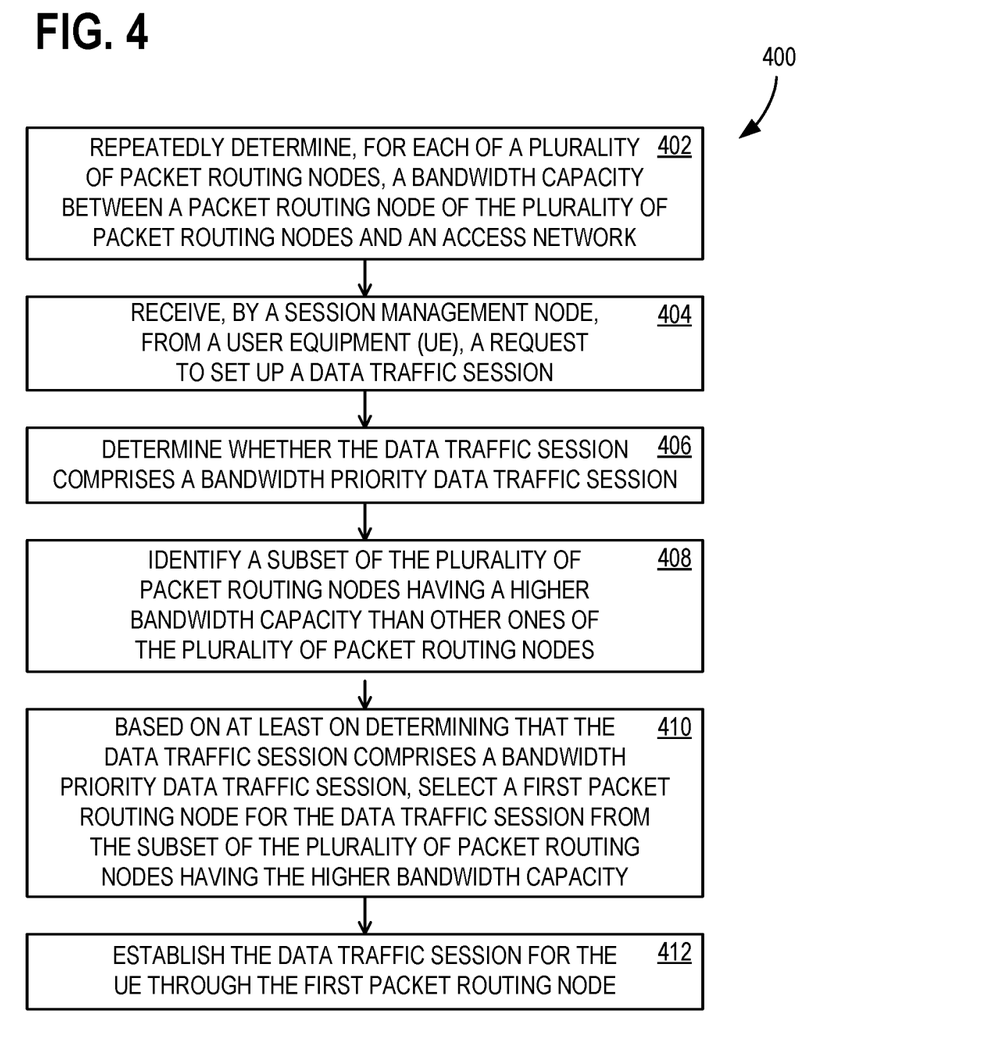
FIG. 4 illustrates another flow chart of exemplary operations associated with the arrangement of FIG. 1.

FIG. 4 illustrates a flowchart 400 of exemplary operations associated with bandwidth-dependent selection of a packet routing node. In some examples, at least a portion of flowchart 400 may be performed using one or more computing devices 500 of FIG. 5. Operation 402 includes repeatedly determining, for each of a plurality of packet routing nodes, a bandwidth capacity between a packet routing node of the plurality of packet routing nodes and an access network. Operation 404 includes receiving, by a session management node, from a user equipment (UE), a request for a data traffic session. Operation 406 includes determining whether the data traffic session comprises a bandwidth priority data traffic session. Operation 408 includes identifying a subset of the plurality of packet routing nodes having a higher bandwidth capacity than other ones of the plurality of packet routing nodes. Operation 410 includes based on at least determining that the data traffic session comprises a bandwidth priority data traffic session, selecting a first packet routing node for the data traffic session from the subset of the plurality of packet routing nodes having the higher bandwidth capacity. Operation 412 includes establishing the data traffic session for the UE through the first packet routing node.

Figure 5:
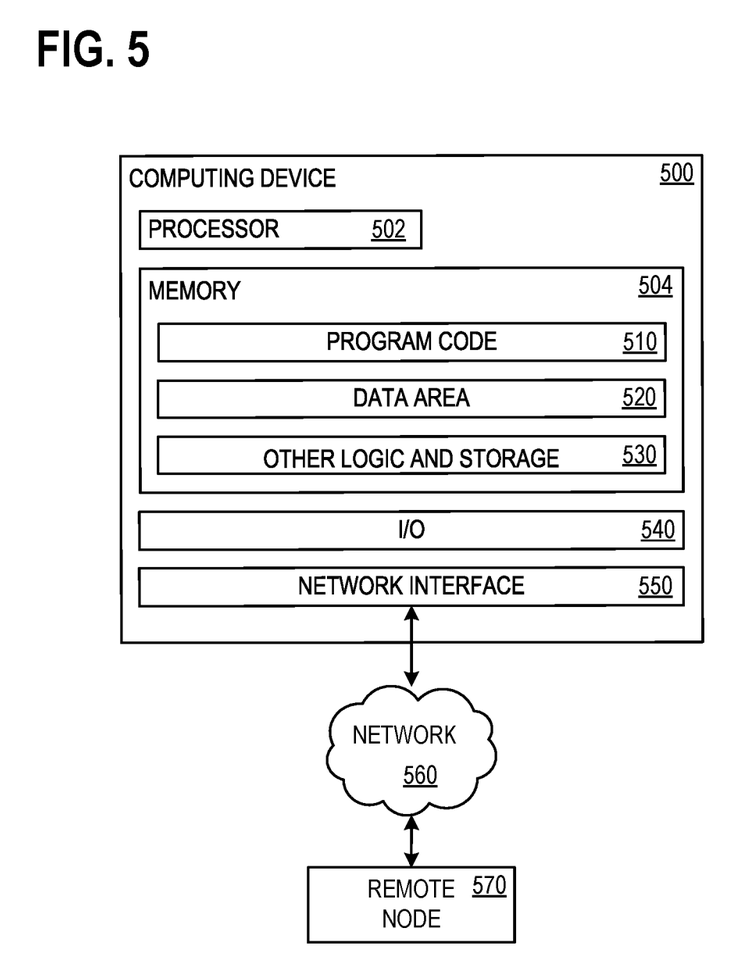
FIG. 5 illustrates a block diagram of a computing device that may be used as a component of the arrangements illustrated in FIGS. 1A and 1B.

FIG. 5 illustrates a block diagram of computing device 500 that may be used as a component of arrangement 100a of FIG. 1A and/or arrangement 100b of FIG. 1B, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

ADDITIONAL EXAMPLES

An example method of bandwidth-dependent selection of a packet routing node comprises: repeatedly determining, for each of a plurality of packet routing nodes, a bandwidth capacity between a packet routing node of the plurality of packet routing nodes and an access network; receiving, by a session management node, from a UE, a request for a data traffic session; determining whether the data traffic session comprises a bandwidth priority data traffic session; identifying a subset of the plurality of packet routing nodes having a higher bandwidth capacity than other ones of the plurality of packet routing nodes; based on at least determining that the data traffic session comprises a bandwidth priority data traffic session, selecting a first packet routing node for the data traffic session from the subset of the plurality of packet routing nodes having the higher bandwidth capacity; and establishing the data traffic session for the UE through the first packet routing node.

An example system for bandwidth-dependent selection of a packet routing node comprises: a processor; and a computer-readable medium storing instructions that are operative upon execution by the processor to: repeatedly determine, for each of a plurality of packet routing nodes, a bandwidth capacity between a packet routing node of the plurality of packet routing nodes and an access network; receive, by a session management node, from a UE, a request for a data traffic session; determine whether the data traffic session comprises a bandwidth priority data traffic session; identify a subset of the plurality of packet routing nodes having a higher bandwidth capacity than other ones of the plurality of packet routing nodes; based on at least determining that the data traffic session comprises a bandwidth priority data traffic session, select a first packet routing node for the data traffic session from the subset of the plurality of packet routing nodes having the higher bandwidth capacity; and establish the data traffic session for the UE through the first packet routing node.

One or more example computer storage devices has computer-executable instructions stored thereon, which, upon execution by a computer, cause the computer to perform operations comprising: repeatedly determining, for each of a plurality of packet routing nodes, a bandwidth capacity between a packet routing node of the plurality of packet routing nodes and an access network; receiving, by a session management node, from a UE, a request for a data traffic session; determining whether the data traffic session comprises a bandwidth priority data traffic session; identifying a subset of the plurality of packet routing nodes having a higher bandwidth capacity than other ones of the plurality of packet routing nodes; based on at least determining that the data traffic session comprises a bandwidth priority data traffic session, selecting a first packet routing node for the data traffic session from the subset of the plurality of packet routing nodes having the higher bandwidth capacity; and establishing the data traffic session for the UE through the first packet routing node.

An exemplary system for establishing a data traffic session for a UE on a network comprises: a processor; and a computer-readable medium storing instructions that are operative upon execution by the processor to: receive, by a session management node, from the UE, a request to set up the data traffic session; determine, by the session management node, an availability or unavailability of a first packet routing node to handle UE data traffic, wherein determining the availability or unavailability of the first packet routing node to handle UE data traffic comprises receiving an indication of the availability or unavailability of the first packet routing node from a network repository; based on at least determining that the first packet routing node is available to handle UE data traffic, establish the data traffic session with the first packet routing node; and based on at least determining that the first packet routing node is unavailable to handle UE data traffic, establish the data traffic session with an available alternate packet routing node.

Alternatively, or in addition to the other examples described herein, examples include any combination of the following:
- determining, for each of the plurality of packet routing nodes, the bandwidth capacity between the packet routing node of the plurality of packet routing nodes and the access network comprises: measuring bandwidth between the packet routing node and the access network; and reporting, to the session management node, the measured bandwidth;
- determining, for each of the plurality of packet routing nodes, the bandwidth capacity between the packet routing node of the plurality of packet routing nodes and the access network comprises: tracking a measured bandwidth history covering a plurality of measured bandwidth values; and based on at least the measured bandwidth history, predicting an expected bandwidth capacity, wherein the bandwidth capacity between the packet routing node of the plurality of packet routing nodes and the access network comprises the expected bandwidth capacity;
- determining whether the data traffic session comprises a bandwidth priority data traffic session comprises: receiving, by the session management node, from a policy node, an indication that the UE is associated with bandwidth prioritization, and wherein a bandwidth priority data traffic session comprises a data traffic session requested by a UE associated with bandwidth prioritization;
- determining whether the data traffic session comprises a bandwidth priority data traffic session further comprises: determining whether the requested data traffic session comprises a session type associated with a bandwidth demand above a bandwidth priority threshold, and wherein a bandwidth priority data traffic session comprises a data traffic session requested by a UE associated with bandwidth prioritization when the requested data traffic session comprises a session type associated with a bandwidth demand above the bandwidth priority threshold;
- determining that the first packet routing node is unable to meet a bandwidth demand of the data traffic session;
- determining that a second packet routing node of the plurality of packet routing nodes is able to meet the bandwidth demand of the data traffic session;
- based on at least determining that the first packet routing node is unable to meet the bandwidth demand of the data traffic session and determining that the second packet routing node is able to meet the bandwidth demand of the data traffic session, transferring the data traffic session from the first packet routing node to the second packet routing node;
- the first packet routing node comprises a UPF;
- the session management node comprises an SMF;
- the first packet routing node comprises a PGW-U;
- the session management node comprises a PGW-C;
- repeatedly determining, for each of the plurality of packet routing nodes, the bandwidth capacity between the packet routing node of the plurality of packet routing nodes and the access network occurs based on at least a trigger condition, the trigger condition comprising: completion of a timer period and/or receiving a request for a data traffic session;
- measuring bandwidth between the packet routing node and the access network comprises transmitting a packet between the packet routing node and the access network;
- determining, for each of the plurality of packet routing nodes, the bandwidth capacity between the packet routing node of the plurality of packet routing nodes and the access network further comprises determining the bandwidth capacity by the session management node;
- the bandwidth capacity between the packet routing node of the plurality of packet routing nodes and the access network comprises the measured bandwidth capacity;
- storing, for each of the plurality of packet routing nodes, the measured bandwidth;
- repeatedly determining, for each of the plurality of packet routing nodes, the bandwidth capacity between the packet routing node of the plurality of packet routing nodes and a plurality of additional access networks;
- determining, for each of the plurality of packet routing nodes, the bandwidth capacity between the packet routing node of the plurality of packet routing nodes and the plurality of additional access networks comprises: measuring bandwidth between combinations of the plurality of packet routing nodes and the plurality of additional access networks; reporting, to the session management node, the measured bandwidths; and storing, for each combination of the plurality of packet routing nodes and the plurality of additional access networks, the measured bandwidth;
- determining, for each of the plurality of packet routing nodes, the bandwidth capacity between the packet routing node of the plurality of packet routing nodes and the access network comprises determining, by the session management node, the bandwidth capacity between the packet routing node of the plurality of packet routing nodes and the access network;
- the request to set up the data traffic session comprises a request for a data traffic session between the UE and a DN;
- receiving, by the session management node, from the UE, the request to set up the data traffic session comprises receiving, by the session management node, through an access node, the request to set up the data traffic session;

receiving, by the session management node, from the access node, identification of the access network;
predicting the expected bandwidth capacity comprises performing a moving window operation on the measured bandwidth history;
predicting the expected bandwidth capacity comprises performing a weighted moving window operation on the measured bandwidth history;
predicting the expected bandwidth capacity comprises providing the measured bandwidth history to an ML model;
determining whether the data traffic session comprises a bandwidth priority data traffic session comprises determining, by the session management node, whether the data traffic session comprises a bandwidth priority data traffic session;
the subset of the plurality of packet routing nodes having the higher bandwidth capacity than other ones of the plurality of packet routing nodes comprises a packet routing node having the highest bandwidth capacity of the plurality of packet routing nodes;
the subset of the plurality of packet routing nodes having the higher bandwidth capacity than other ones of the plurality of packet routing nodes comprises a subset of packet routing nodes having a bandwidth capacity above a minimum performance threshold;
the subset of the plurality of packet routing nodes having the higher bandwidth capacity than other ones of the plurality of packet routing nodes comprises a subset of packet routing nodes having a bandwidth capacity within a top predetermined percentage of the plurality of packet routing nodes;
receiving, by the session management node, from a second UE, a request to set up a second data traffic session;
determining whether the second data traffic session comprises a bandwidth priority data traffic session;
based on at least determining that the second data traffic session comprises a bandwidth priority data traffic session, selecting a different packet routing node for the second data traffic session than for the first data traffic session; and
establishing the second data traffic session for the second UE through the selected different packet routing node;
the access network comprises a RAN;
the DN comprises a PDN;
the access node comprises an AMF;
the policy node comprises a PCF;
the access node comprises an MME;
the policy node comprises a PCRF;
the first packet routing node further comprises an SGW-U;
the first packet routing node comprises an SAEGW-U;
the session management node further comprises an SGW-C; and
the session management node comprises an SAEGW-C.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of bandwidth-dependent selection of a packet routing node, the method comprising:
   repeatedly determining, for each of a plurality of packet routing nodes, a bandwidth capacity between a packet routing node of the plurality of packet routing nodes and an access network;
   receiving, by a session management node, from a user equipment (UE), a request for a data traffic session;
   determining whether the data traffic session comprises a bandwidth priority data traffic session;
   identifying a subset of the plurality of packet routing nodes having a higher bandwidth capacity than other ones of the plurality of packet routing nodes;
   based on at least determining that the data traffic session comprises a bandwidth priority data traffic session, selecting a first packet routing node for the data traffic session from the subset of the plurality of packet routing nodes having the higher bandwidth capacity; and
   establishing the data traffic session for the UE through the first packet routing node.

2. The method of claim 1, wherein determining, for each of the plurality of packet routing nodes, the bandwidth capacity between the packet routing node of the plurality of packet routing nodes and the access network comprises:
   measuring bandwidth between the packet routing node and the access network; and
   reporting, to the session management node, the measured bandwidth.

3. The method of claim 2, wherein determining, for each of the plurality of packet routing nodes, the bandwidth capacity between the packet routing node of the plurality of packet routing nodes and the access network comprises:
   tracking a measured bandwidth history covering a plurality of measured bandwidth values; and
   based on at least the measured bandwidth history, predicting an expected bandwidth capacity, wherein the bandwidth capacity between the packet routing node of the plurality of packet routing nodes and the access network comprises the expected bandwidth capacity.

4. The method of claim 1, wherein determining whether the data traffic session comprises a bandwidth priority data traffic session comprises:
   receiving, by the session management node, from a policy node, an indication that the UE is associated with bandwidth prioritization, and wherein a bandwidth priority data traffic session comprises a data traffic session requested by a UE associated with bandwidth prioritization.

5. The method of claim 4, wherein determining whether the data traffic session comprises a bandwidth priority data traffic session further comprises:
  determining whether the requested data traffic session comprises a session type associated with a bandwidth demand above a bandwidth priority threshold, and wherein a bandwidth priority data traffic session comprises a data traffic session requested by a UE associated with bandwidth prioritization when the requested data traffic session comprises a session type associated with a bandwidth demand above the bandwidth priority threshold.

6. The method of claim 1, further comprising:
  determining that the first packet routing node is unable to meet a bandwidth demand of the data traffic session;
  determining that a second packet routing node of the plurality of packet routing nodes is able to meet the bandwidth demand of the data traffic session; and
  based on at least determining that the first packet routing node is unable to meet the bandwidth demand of the data traffic session and determining that the second packet routing node is able to meet the bandwidth demand of the data traffic session, transferring the data traffic session from the first packet routing node to the second packet routing node.

7. The method of claim 1,
  wherein the first packet routing node comprises a user plane function (UPF) and the session management node comprises a session management function (SMF); or
  wherein the first packet routing node comprises a packet data network gateway (PGW) user plane function (PGW-U) and the session management node comprises a PGW control plane function (PGW-C).

8. A system for bandwidth-dependent selection of a packet routing node, the system comprising:
  a processor; and
  a computer-readable medium storing instructions that are operative upon execution by the processor to:
    repeatedly determine, for each of a plurality of packet routing nodes, a bandwidth capacity between a packet routing node of the plurality of packet routing nodes and an access network;
    receive, by a session management node, from a user equipment (UE), a request for a data traffic session;
    determine whether the data traffic session comprises a bandwidth priority data traffic session;
    identify a subset of the plurality of packet routing nodes having a higher bandwidth capacity than other ones of the plurality of packet routing nodes;
    based on at least determining that the data traffic session comprises a bandwidth priority data traffic session, select a first packet routing node for the data traffic session from the subset of the plurality of packet routing nodes having the higher bandwidth capacity; and
    establish the data traffic session for the UE through the first packet routing node.

9. The system of claim 8, wherein determining, for each of the plurality of packet routing nodes, the bandwidth capacity between the packet routing node of the plurality of packet routing nodes and the access network comprises:
  measuring bandwidth between the packet routing node and the access network; and
  reporting, to the session management node, the measured bandwidth.

10. The system of claim 9, wherein determining, for each of the plurality of packet routing nodes, the bandwidth capacity between the packet routing node of the plurality of packet routing nodes and the access network comprises:
  tracking a measured bandwidth history covering a plurality of measured bandwidth values; and
  based on at least the measured bandwidth history, predicting an expected bandwidth capacity, wherein the bandwidth capacity between the packet routing node of the plurality of packet routing nodes and the access network comprises the expected bandwidth capacity.

11. The system of claim 8, wherein determining whether the data traffic session comprises a bandwidth priority data traffic session comprises:
  receiving, by the session management node, from a policy node, an indication that the UE is associated with bandwidth prioritization, and wherein a bandwidth priority data traffic session comprises a data traffic session requested by a UE associated with bandwidth prioritization.

12. The system of claim 11, wherein determining whether the data traffic session comprises a bandwidth priority data traffic session further comprises:
  determining whether the requested data traffic session comprises a session type associated with a bandwidth demand above a bandwidth priority threshold, and wherein a bandwidth priority data traffic session comprises a data traffic session requested by a UE associated with bandwidth prioritization when the requested data traffic session comprises a session type associated with a bandwidth demand above the bandwidth priority threshold.

13. The system of claim 8, wherein the operations are further operative to:
  determine that the first packet routing node is unable to meet a bandwidth demand of the data traffic session;
  determine that a second packet routing node of the plurality of packet routing nodes is able to meet the bandwidth demand of the data traffic session; and
  based on at least determining that the first packet routing node is unable to meet the bandwidth demand of the data traffic session and determining that the second packet routing node is able to meet the bandwidth demand of the data traffic session, transfer the data traffic session from the first packet routing node to the second packet routing node.

14. The system of claim 8,
  wherein the first packet routing node comprises a user plane function (UPF) and the session management node comprises a session management function (SMF); or
  wherein the first packet routing node comprises a packet data network gateway (PGW) user plane function (PGW-U) and the session management node comprises a PGW control plane function (PGW-C).

15. One or more computer storage devices having computer-executable instructions stored thereon, which, upon execution by a computer, cause the computer to perform operations comprising:
  repeatedly determining, for each of a plurality of packet routing nodes, a bandwidth capacity between a packet routing node of the plurality of packet routing nodes and an access network;
  receiving, by a session management node, from a user equipment (UE), a request for a data traffic session;
  determining whether the data traffic session comprises a bandwidth priority data traffic session;
  identifying a subset of the plurality of packet routing nodes having a higher bandwidth capacity than other ones of the plurality of packet routing nodes;

based on at least determining that the data traffic session comprises a bandwidth priority data traffic session, selecting a first packet routing node for the data traffic session from the subset of the plurality of packet routing nodes having the higher bandwidth capacity; and establishing the data traffic session for the UE through the first packet routing node.

16. The one or more computer storage devices of claim 15, wherein determining, for each of the plurality of packet routing nodes, the bandwidth capacity between the packet routing node of the plurality of packet routing nodes and the access network comprises determining, by the session management node, the bandwidth capacity between the packet routing node of the plurality of packet routing nodes and the access network.

17. The one or more computer storage devices of claim 16, wherein determining, for each of the plurality of packet routing nodes, the bandwidth capacity between the packet routing node of the plurality of packet routing nodes and the access network comprises:

tracking a measured bandwidth history covering a plurality of measured bandwidth values; and based on at least the measured bandwidth history, predicting an expected bandwidth capacity, wherein the bandwidth capacity between the packet routing node of the plurality of packet routing nodes and the access network comprises the expected bandwidth capacity.

18. The one or more computer storage devices of claim 15, wherein determining whether the data traffic session comprises a bandwidth priority data traffic session comprises:

receiving, by the session management node, from a policy node, an indication that the UE is associated with bandwidth prioritization, and wherein a bandwidth priority data traffic session comprises a data traffic session requested by a UE associated with bandwidth prioritization.

19. The one or more computer storage devices of claim 18, wherein determining whether the data traffic session comprises a bandwidth priority data traffic session further comprises:

determining whether the requested data traffic session comprises a session type associated with a bandwidth demand above a bandwidth priority threshold, and wherein a bandwidth priority data traffic session comprises a data traffic session requested by a UE associated with bandwidth prioritization when the requested data traffic session comprises a session type associated with a bandwidth demand above the bandwidth priority threshold.

20. The one or more computer storage devices of claim 15, wherein the operations further comprise:

determining that the first packet routing node is unable to meet a bandwidth demand of the data traffic session;

determining that a second packet routing node of the plurality of packet routing nodes is able to meet the bandwidth demand of the data traffic session; and based on at least determining that the first packet routing node is unable to meet the bandwidth demand of the data traffic session and determining that the second packet routing node is able to meet the bandwidth demand of the data traffic session, transferring the data traffic session from the first packet routing node to the second packet routing node.

* * * * *